US012499234B2

(12) United States Patent
Kim et al.

(10) Patent No.: US 12,499,234 B2
(45) Date of Patent: Dec. 16, 2025

(54) ARTIFICIAL INTELLIGENCE-BASED AUTOMATED METHOD FOR RESTORING MASK ROM FIRMWARE BINARY AND APPARATUS FOR THE SAME

(71) Applicant: ELECTRONICS AND TELECOMMUNICATIONS RESEARCH INSTITUTE, Daejeon (KR)

(72) Inventors: Dae-Won Kim, Daejeon (KR); Sang-Su Lee, Daejeon (KR); Yong-Je Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 88 days.

(21) Appl. No.: 18/418,441

(22) Filed: Jan. 22, 2024

(65) Prior Publication Data

US 2025/0094595 A1    Mar. 20, 2025

(30) Foreign Application Priority Data

Sep. 18, 2023 (KR) .......................... 10-2023-0124031

(51) Int. Cl.
G06F 21/57 (2013.01)
G06F 21/64 (2013.01)

(52) U.S. Cl.
CPC ............ G06F 21/572 (2013.01); G06F 21/64 (2013.01)

(58) Field of Classification Search
CPC .... G06F 21/572; G06F 21/64; G06F 11/1446; G06F 8/74; G06F 11/0736; G06F 11/0793; G06F 21/577; G06N 20/00
See application file for complete search history.

(56) References Cited

U.S. PATENT DOCUMENTS

| 9,142,317 | B2 | 9/2015 | Lee et al. | |
| 10,657,262 | B1* | 5/2020 | Cui | G06F 21/54 |
| 11,074,062 | B1* | 7/2021 | Hosic | G06F 8/65 |
| 11,556,640 | B1 | 1/2023 | Tully et al. | |
| 2003/0135791 | A1* | 7/2003 | Natvig | G06F 21/566 |
| | | | | 714/38.12 |
| 2013/0283256 | A1* | 10/2013 | Proud | H02J 50/20 |
| | | | | 717/172 |
| 2020/0234131 | A1* | 7/2020 | Lee | G06N 3/045 |
| 2021/0042035 | A1* | 2/2021 | Futagi | G06F 11/1417 |
| 2022/0244892 | A1* | 8/2022 | Wushour | G06F 9/455 |
| 2023/0004499 | A1 | 1/2023 | Choi et al. | |
| 2023/0142407 | A1 | 5/2023 | Kim et al. | |
| 2024/0320090 | A1* | 9/2024 | Sunny | G06F 11/1044 |
| 2025/0004915 | A1* | 1/2025 | Rudenko | G06F 11/3604 |

FOREIGN PATENT DOCUMENTS

KR    10-2014-0146876 A    12/2014
KR    10-2022-0141490 A    10/2022

* cited by examiner

Primary Examiner — Lynn D Feild
Assistant Examiner — Ethan V Vo
(74) Attorney, Agent, or Firm — Sughrue Mion, PLLC

(57) ABSTRACT

Disclosed herein are an Artificial Intelligence (AI)-based automated method for restoring a mask Read-Only Memory (ROM) firmware binary and an apparatus for the same. The AI-based automated method is performed by an AI-based automated apparatus for restoring a mask ROM firmware binary, and includes generating a bit-order list by inputting bit information and a parameter that are input for restoration to a pre-trained generation model, and restoring a firmware binary based on the bit-order list.

10 Claims, 5 Drawing Sheets

|   | 0 | 1 | 2 | HORIZONTAL COORDINATE |
|---|---|---|---|---|
| 0 | 1 | 1 | 0 | |
| 1 | 0 | 1 | 1 | |
| 2 | 0 | 1 | 0 | |

VERTICAL COORDINATE

FIG. 4

| ORDER | HORIZONTAL | VERTICAL |
|---|---|---|
| 1 | 0 | 1 |
| 2 | 1 | 1 |
| 3 | 2 | 1 |
| 4 | 0 | 2 |
| 5 | 1 | 2 |
| 6 | 2 | 2 |
| 7 | 0 | 0 |
| 8 | 1 | 0 |
| 9 | 2 | 0 |

FIG. 5

ARTIFICIAL INTELLIGENCE-BASED AUTOMATED METHOD FOR RESTORING MASK ROM FIRMWARE BINARY AND APPARATUS FOR THE SAME

CROSS REFERENCE TO RELATED APPLICATION

This application claims the benefit of Korean Patent Application No. 10-2023-0124031, filed Sep. 18, 2023, which is hereby incorporated by reference in its entirety into this application.

BACKGROUND OF THE INVENTION

1. Technical Field

The present disclosure relates generally to Artificial Intelligence (AI)-based automated mask Read Only Memory (ROM) firmware binary restoration technology, and more particularly to hardware security and firmware reverse engineering technology.

2. Description of the Related Art

Security issues attributable to backdoors or vulnerabilities within embedded system firmware are becoming increasingly serious.

Although embedded systems are utilized in various fields such as national defense, drones, Internet-of-Things (IoT), Artificial Intelligence (AI) servers, and autonomous driving, most operations do not conduct threat analysis due to a lack of awareness regarding firmware threat analysis, difficulties in acquiring actual device firmware, etc.

Recently, the severity of firmware security threats has been increasing, but it is not easy even to acquire actual device On-PCB firmware, and, especially, it is technically difficult to restore firmware binaries stored in a bit form in a mask ROM (MASK ROM).

Although manual analysis by top-level reverse engineering experts can be conducted for mask ROM firmware restoration, a storage method thereof is not disclosed, thus resulting in a low restoration success rate relative to human resources, time, and cost that are involved in restoration.

PRIOR ART DOCUMENTS

Patent Documents (Patent Document 1) Korean Patent Application Publication No 10-2014-0146876, Date of Publication: Dec. 29, 2014 (Title: Embedded memory device and memory controller including it)

SUMMARY OF THE INVENTION

Accordingly, the present disclosure has been made keeping in mind the above problems occurring in the prior art, and an object of the present disclosure is to provide AI-based automated technology for restoring mask ROM firmware binaries.

Another object of the present disclosure is to perform mask ROM firmware binary restoration having a high success rate relative to human resources, time, and cost.

In accordance with an aspect of the present disclosure to accomplish the above objects, there is provided an Artificial Intelligence (AI)-based automated method for restoring a mask Read-Only Memory (ROM) firmware binary, the AI-based automated method being performed by an AI-based automated apparatus for restoring a mask ROM firmware binary, the AI-based automated method including generating a bit-order list by inputting bit information and a parameter that are input for restoration to a pre-trained generation model; and restoring a firmware binary based on the bit-order list.

The pre-trained generation model may correspond to a model trained in consideration of an independent variable and a dependent variable of chip data and a bit-order list generation policy.

The bit-order list generation policy may be established based on a characteristic of the parameter associated with generation of the bit-order list.

The AI-based automated method may further include performing system verification on the firmware binary based on string detection, executable code detection, and loop code detection.

The AI-based automated method may further include updating the pre-trained generation model by utilizing a system verification result based on the system verification and a result of user verification on the firmware binary as feedback information.

In accordance with another aspect of the present disclosure to accomplish the above objects, there is provided an Artificial Intelligence (AI)-based automated apparatus for restoring a mask Read-Only Memory (ROM) firmware binary, including a processor configured to generate a bit-order list by inputting bit information and a parameter that are input for restoration to a pre-trained generation model, and restore a firmware binary based on the bit-order list; and a memory configured to store the pre-trained generation model.

The pre-trained generation model may correspond to a model trained in consideration of an independent variable and a dependent variable of chip data and a bit-order list generation policy.

The bit-order list generation policy may be established based on a characteristic of the parameter associated with generation of the bit-order list.

The processor may be configured to perform system verification on the firmware binary based on string detection, executable code detection, and loop code detection.

The processor may be configured to update the pre-trained generation model by utilizing a system verification result based on the system verification and a result of user verification on the firmware binary as feedback information.

BRIEF DESCRIPTION OF THE DRAWINGS

The above and other objects, features and advantages of the present disclosure will be more clearly understood from the following detailed description taken in conjunction with the accompanying drawings, in which:

FIG. 4 is a diagram illustrating an example of two-dimensional (2D) text bit information extracted from mask ROM according to the present disclosure;

FIG. 5 is a diagram illustrating an example of a bit-order list for the 2D text bit information illustrated in FIG. 4;

DESCRIPTION OF THE PREFERRED EMBODIMENTS

Figure 1:
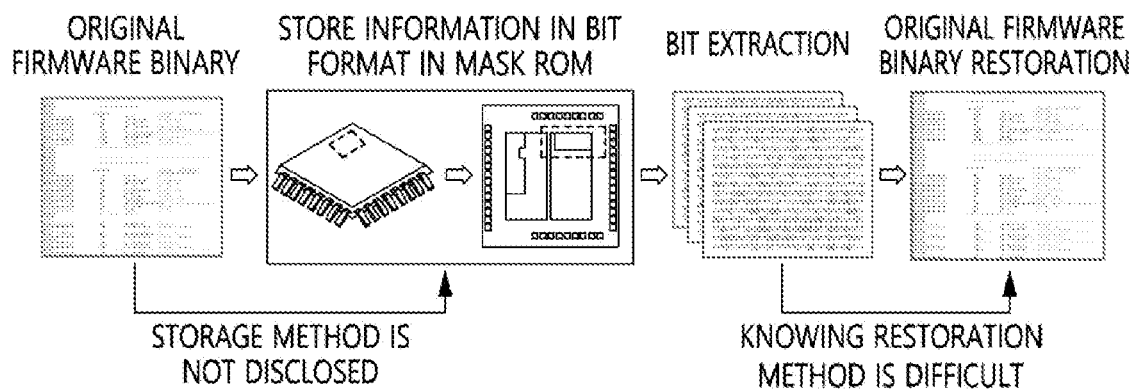
FIG. 1 is a diagram illustrating an example of a conventional mask ROM firmware binary restoration process.

The present disclosure will be described in detail below with reference to the accompanying drawings. Repeated descriptions and descriptions of known functions and configurations which have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated to make the description clearer.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Hereinafter, preferred embodiments of the present disclosure will be described in detail with reference to the attached drawings.

FIG. 1 is a diagram illustrating an example of a conventional mask ROM firmware binary restoration process.

FIG. 1 illustrates a difficulty in mask ROM firmware binary restoration.

For the protection of corporate technological know-how and intellectual property, a method of storing firmware in mask ROM is not generally disclosed. Due thereto, it is difficult to know a method for restoring an original firmware binary from extracted bit information.

Therefore, manual analysis by top-level reverse engineering experts is inevitably conducted for mask ROM firmware restoration. However, as illustrated in FIG. 1, a firmware storage method is not generally disclosed, and thus a problem arises in that a restoration success rate is low compared to human resources, time, and cost that are involved in mask ROM firmware restoration.

The present disclosure is intended to solve this problem and propose technology that is capable of restoring a mask ROM firmware binary using an automated method.

Figure 2:
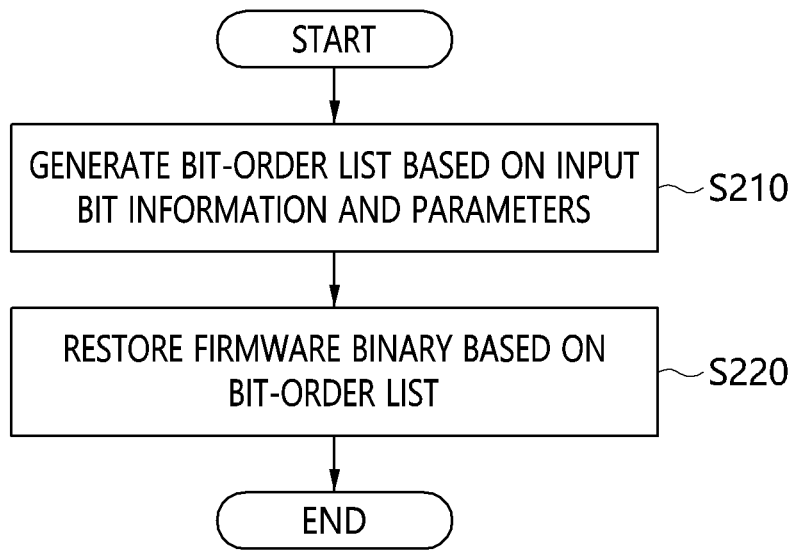
FIG. 2 is an operation flowchart illustrating an AI-based automated method for restoring a mask ROM firmware binary according to an embodiment of the present disclosure.

FIG. 2 is an operation flowchart illustrating an AI-based automated method for restoring a mask ROM firmware binary according to an embodiment of the present disclosure.

Referring to FIG. 2, the AI-based automated method for restoring a mask ROM firmware binary (hereinafter also referred to as "AI-based automated mask ROM firmware binary restoration method") according to an embodiment of the present disclosure allows an AI-based automated apparatus for restoring a mask ROM firmware binary (hereinafter also referred to as "AI-based automated mask ROM firmware binary restoration apparatus") to generate a bit-order list by inputting bit information and parameters that are input for restoration to a pre-trained generation model at step S210.

Figure 3:
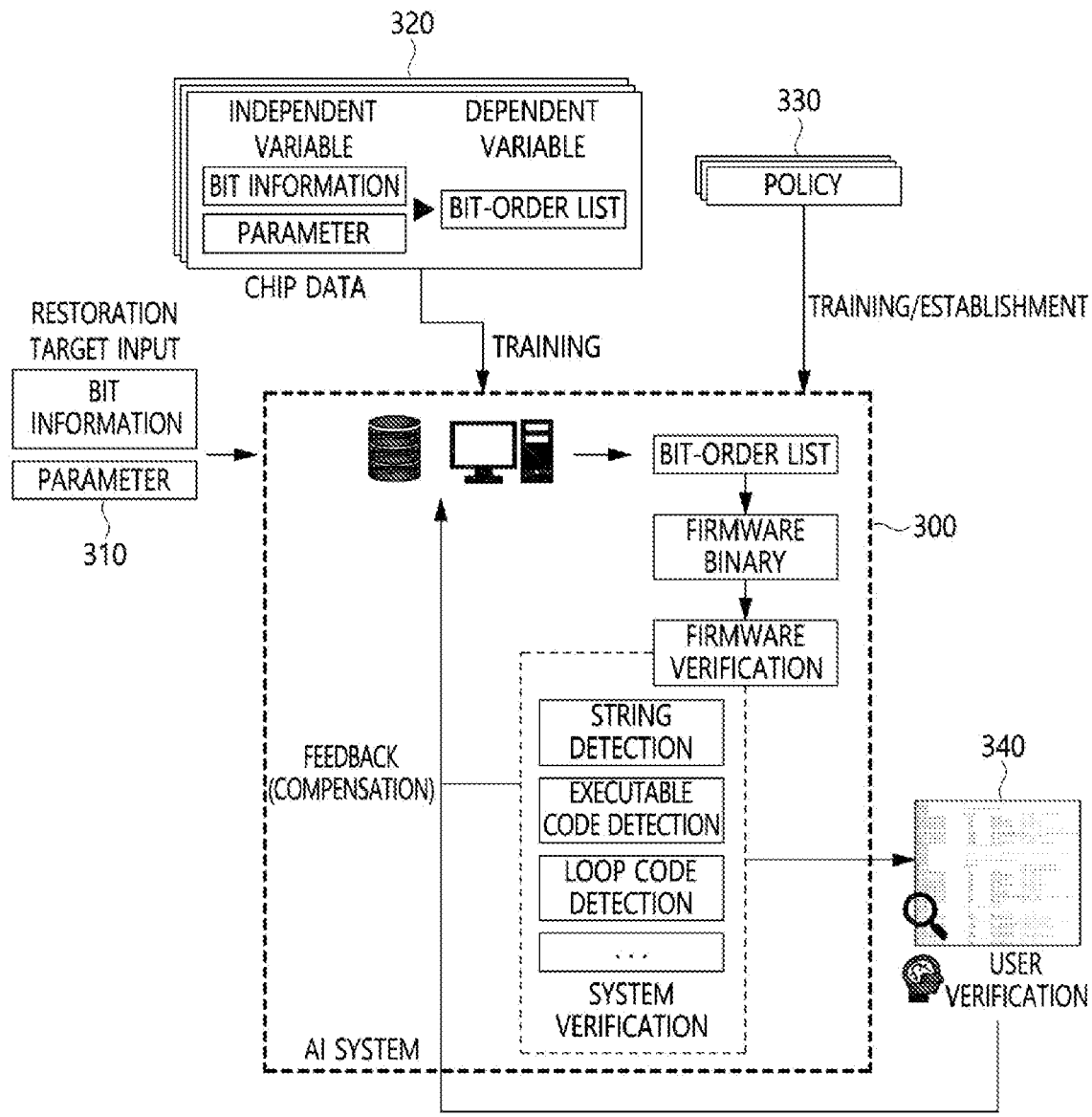
FIG. 3 is a diagram illustrating an AI-based automated system for restoring a mask ROM firmware binary according to the present disclosure.

For example, FIG. 3 is a diagram illustrating a system according to the present disclosure, wherein, when bit information and parameters 310 corresponding to a restoration target are input to the AI-based automated mask ROM firmware binary restoration apparatus 300, a bit-order list may be generated by inputting the bit information and parameters 310 to a pre-trained generation model provided in the apparatus 300.

Here, the pre-trained generation model may correspond to a model trained in consideration of an independent variable and dependent variable of chip data and bit-order list generation policies.

For example, as illustrated in FIG. 3, the independent variable and dependent variable 320 of the chip data may be input to train the generation model.

Here, the independent variable of the chip data may correspond to the bit information and parameters, and the dependent variable of the chip data may correspond to the bit-order list in which bits are selected from bit information.

Here, the bit information may correspond to two-dimensional (2D) text composed of 0 and 1.

Here, the parameters may denote information about mask ROM firmware, and may correspond to values indicated in the following Table 1.

TABLE 1

| Parameter | Description |
| --- | --- |
| PartNumber | Part number (e.g., CHIP 5800) |
| ChipFamily | Chip series (e.g., CHIP58) |
| Endianness | Big or Little |
| WordBits | Unit by which core processor reads bits from mask ROM (e.g., 16 bits) |
| MaskROMSize | Size of mask ROM (e.g., 32,768 bits) |
| Manufacturer | Manufacturer (e.g., ChipMaker) |
| Architecture | Chip architecture (ex: ARM v3) |
| ProcessorBits | Processing bits of core processor (e.g., 4 bits) |
| DecoderPosition | Positions of X and Y axis decoders of mask ROM (e.g., upper-left) |
| ExtractedLayout | Mask ROM layout (e.g., w512 × h64) |
| BitInversion | Whether or not bits extracted from mask ROM are inverted (e.g., FALSE-non-inverted, TRUE-inverted) |

Here, the bit-order list may be information indicating the order in which bits are selected from the bit information configured using 2D text composed of 0 and 1.

For example, assuming that the original firmware binary is configured in the order of '011', '010', and '110', the bit information of the 2D text extracted from the mask ROM may be represented, as shown in FIG. 4, and the bit-order list indicating the order in which these bits are selected may be represented, as shown in FIG. 5.

Here, the independent variable and the dependent variable may correspond to a relationship between a cause and an effect, and thus the generation model may be trained to output the dependent variable when the independent variable is input.

Here, the generation model for generating the bit-order list may be trained through policy-based reinforcement learning.

Generally, more learning data is required for enforcement learning, but it is difficult to obtain learning data related to mask ROM firmware restoration.

Therefore, the present disclosure may train the generation model using the policy-based reinforcement learning.

Here, bit-order list generation policies may be established based on the characteristics of parameters associated with the generation of the bit-order list.

That is, the bit-order list generation policies may be configured such that the characteristics of the parameters are associated with the generation of the bit-order list.

In an example, a policy indicating that, when PartNumber (part number) values, among the parameters, are identical to each other, bit-order lists are identical to each other may be established.

In another example, assuming that, among the parameters, DecoderPosition (i.e., the positions of the X and Y axis decoders of the mask ROM) corresponds to an upper-left position, ExtractedLayout (i.e., mask ROM layout) is 'w512×h64', and WordBits (i.e., the unit by which the core processor reads bits from the mask ROM) is 16 bits, a policy indicating that 64 bytes are generated by combining bit values spaced apart from each other by 16 bits in a horizontal direction in each extraction row may be established.

Therefore, the AI-based automated mask ROM firmware binary restoration apparatus 300 according to the present disclosure may associate the independent variable and dependent variable data, trained with the bit information and parameters 310 corresponding to the input restoration target, with preset policies, and may generate the bit-order list as the result of the association.

Further, the AI-based automated mask ROM firmware binary restoration method according to the embodiment of the present disclosure allows the AI-based automated mask ROM firmware binary restoration apparatus to restore the firmware binary based on the bit-order list at step S220.

Furthermore, although not illustrated in FIG. 2, the AI-based automated mask ROM firmware binary restoration method according to the embodiment of the present disclosure allows the AI-based automated mask ROM firmware binary restoration apparatus to perform system verification on the firmware binary based on string detection, executable code detection, and loop code detection.

Here, when any meaningful string is present in each restored firmware binary, when executable code having a meaningful flow is present, or when code having an iterative processing function of forming a loop is present, it may be determined that the possibility of firmware restoration being succeeded is high.

When firmware is encoded and encrypted, it may be impossible to detect a string or executable code. Therefore, because, for normally restored firmware, code for decoding and decrypting the firmware is present, the loop code detection function is required.

Furthermore, although not illustrated in FIG. 2, the AI-based automated mask ROM firmware binary restoration method according to the embodiment of the present disclosure allows the AI-based automated mask ROM firmware binary restoration apparatus to update the pre-trained generation model by utilizing a system verification result based on system verification and the result of user verification on the firmware binary as feedback information.

For example, referring to FIG. 3, the AI-based automated mask ROM firmware binary restoration apparatus 300 internally performs system verification using functions such as string detection, executable code detection, and loop code detection, and provides the result 340 of the system verification to a user who conducts firmware reverse engineering, thus helping the user finally check whether restoration through the analysis of reverse engineering has succeeded.

Thereafter, the system verification result and the user verification result may be fed back into the AI-based automated mask ROM firmware binary restoration apparatus 300, as illustrated in FIG. 3, and may be input as compensation for reinforcing the capability to combine bits in the bit-order list.

Through these processes, the success rate of the automated firmware binary restoration function of the AI-based automated mask ROM firmware binary restoration apparatus 300 may be gradually improved.

By means of the AI-based automated mask ROM firmware binary restoration method, there can be provided AI-based automated technology for restoring mask ROM firmware binaries.

Further, the present disclosure may perform mask ROM firmware binary restoration having a high success rate relative to human resources, time, and cost.

Figure 6:
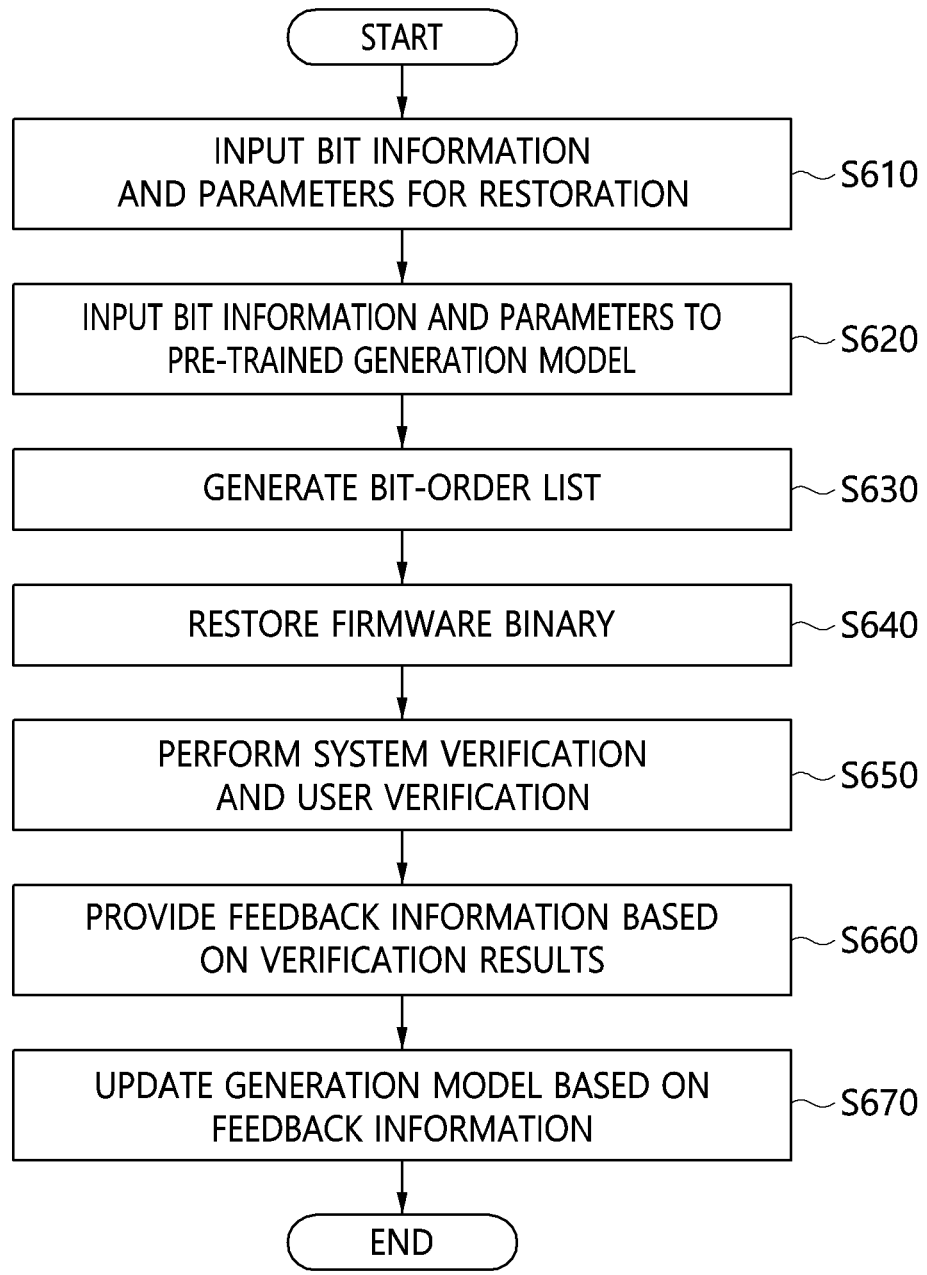
FIG. 6 is an operation flowchart illustrating in detail an AI-based automated method for restoring a mask ROM firmware binary according to an embodiment of the present disclosure.

FIG. 6 is an operation flowchart illustrating in detail an AI-based automated method for restoring a mask ROM firmware binary according to an embodiment of the present disclosure.

Referring to FIG. 6, in the AI-based automated mask ROM firmware binary restoration method according to the embodiment of the present disclosure, when bit information and parameters for restoration are input at step S610, the bit information and parameters may be input to a pre-trained generation model at step S620.

Thereafter, when the pre-trained generation model generates a bit-order list as an output result at step S630, a firmware binary may be restored based on the bit-order list at step S640.

Thereafter, system verification and user verification on the restored firmware binary may be performed at step S650, and feedback information based on the result of system verification and the result of user verification may be provided at step S660, whereby the pre-trained generation model may be updated at step S670.

Figure 7:
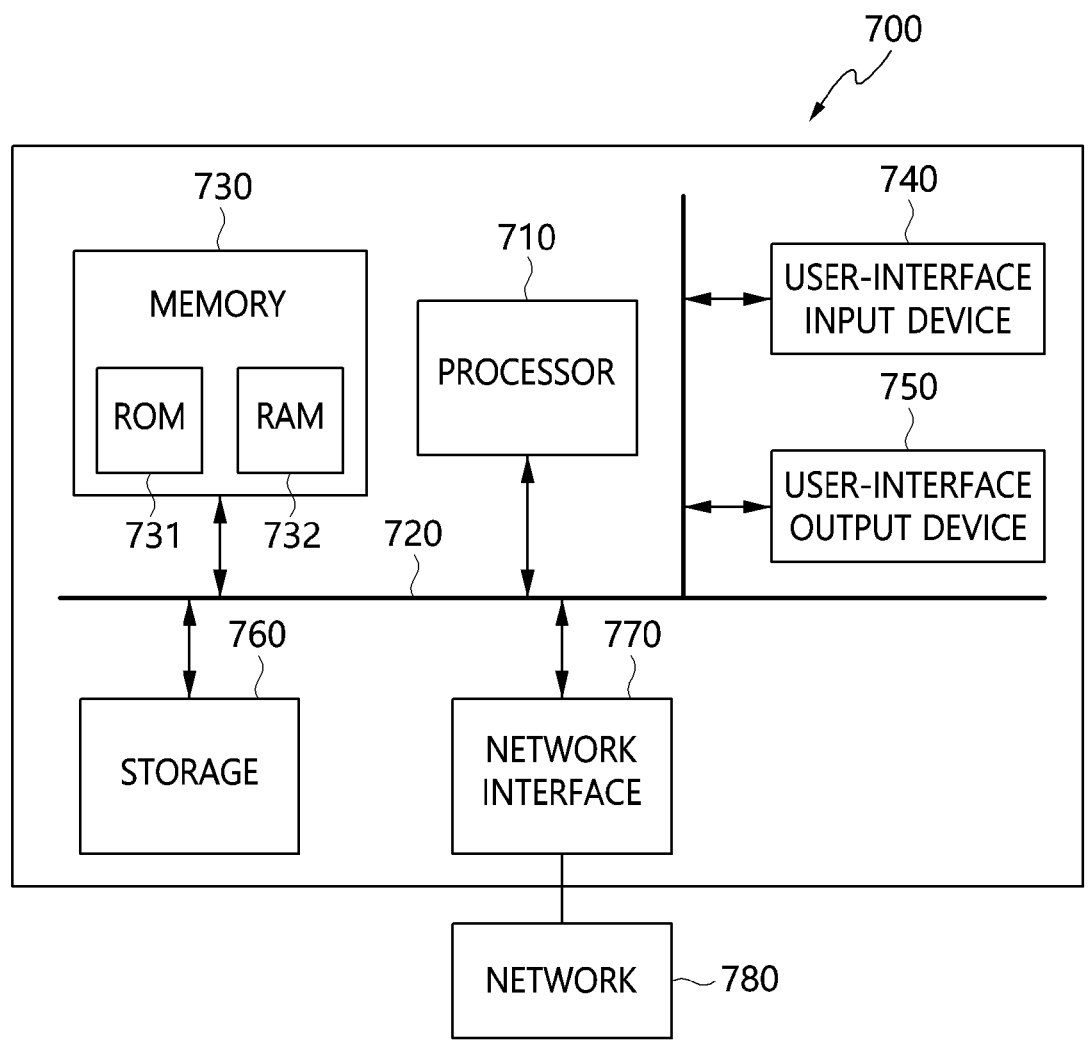
FIG. 7 is a diagram illustrating an AI-based automated apparatus for restoring a mask ROM firmware binary according to the present disclosure.

FIG. 7 is a diagram illustrating an AI-based automated apparatus for restoring a mask ROM firmware binary according to the present disclosure.

Referring to FIG. 7, the AI-based automated mask ROM firmware binary restoration apparatus according to the embodiment of the present disclosure may be implemented in a computer system such as a computer readable storage medium. As illustrated in FIG. 7, a computer system 700 may include one or more processors 710, memory 730, a user interface input device 740, a user interface output device 750, and storage 760, which communicate with each other through a bus 720. The computer system 700 may further include a network interface 770 connected to a network 780. Each processor 710 may be a Central Processing Unit (CPU) or a semiconductor device for executing processing instructions stored in the memory 730 or the storage 760. Each of the memory 730 and the storage 760 may be any of various types of volatile or nonvolatile storage media. For example, the memory 730 may include Read-Only Memory (ROM) 731 or Random Access Memory (RAM) 732.

Therefore, the embodiment of the present disclosure may be implemented as a non-transitory computer-readable medium in which a computer-implemented method or computer-executable instructions are stored. When the computer-readable instructions are executed by the processor, the computer-readable instructions may perform the method according to at least one aspect of the present disclosure.

The processor 710 generates a bit-order list by inputting bit information and parameters that are input for restoration to a pre-trained generation model.

For example, FIG. 3 is a diagram illustrating a system according to the present disclosure, wherein, when bit information and parameters 310 corresponding to a restoration target are input to the AI-based automated mask ROM firmware binary restoration apparatus 300, a bit-order list may be generated by inputting the bit information and parameters 310 to a pre-trained generation model provided in the apparatus 300.

Here, the pre-trained generation model may correspond to a model trained in consideration of an independent variable and dependent variable of chip data and bit-order list generation policies.

For example, as illustrated in FIG. 3, the independent variable and dependent variable 320 of the chip data may be input to train the generation model.

Here, the independent variable of the chip data may correspond to the bit information and parameters, and the dependent variable of the chip data may correspond to the bit-order list in which bits are selected from bit information.

Here, the bit information may correspond to two-dimensional (2D) text composed of 0 and 1.

Here, the parameters may denote information about mask ROM firmware, and may correspond to values indicated in the following Table 1.

Here, the bit-order list may be information indicating the order in which bits are selected from the bit information configured using 2D text composed of 0 and 1.

For example, assuming that an original firmware binary is configured in the order of '011', '010', and '110', the bit information of the 2D text extracted from the mask ROM may be represented, as shown in FIG. 4, and the bit-order list indicating the order in which these bits are selected may be represented, as shown in FIG. 5.

Here, the independent variable and the dependent variable may correspond to a relationship between a cause and an effect, and thus the generation model may be trained to output the dependent variable when the independent variable is input.

Here, the generation model for generating the bit-order list may be trained through policy-based reinforcement learning.

Generally, more learning data is required for enforcement learning, but it is difficult to obtain learning data related to mask ROM firmware restoration.

Therefore, the present disclosure may train the generation model using the policy-based reinforcement learning.

Here, bit-order list generation policies may be established based on the characteristics of parameters associated with the generation of the bit-order list.

That is, the bit-order list generation policies may be configured such that the characteristics of the parameters are associated with the generation of the bit-order list.

In an example, a policy indicating that, when PartNumber (part number) values, among the parameters, are identical to each other, bit-order lists are identical to each other may be established.

In another example, assuming that, among the parameters, DecoderPosition (i.e., the positions of the X and Y axis decoders of the mask ROM) corresponds to an upper-left position, ExtractedLayout (i.e., mask ROM layout) is 'w512×h64', and WordBits (i.e., the unit by which the core processor reads bits from the mask ROM) is 16 bits, a policy indicating that 64 bytes are generated by combining bit values spaced apart from each other by 16 bits in a horizontal direction in each extraction row may be established.

Therefore, the AI-based automated mask ROM firmware binary restoration apparatus 300 according to the present disclosure may associate the independent variable and dependent variable data, trained with the bit information and parameters 310 corresponding to the input restoration target, with preset policies, and may generate the bit-order list as the result of the association.

Further, the processor 710 may restore the firmware binary based on the bit-order list.

Furthermore, the processor 710 may perform system verification on the firmware binary based on string detection, executable code detection, and loop code detection.

Here, when any meaningful string is present in the restored firmware binary, when executable code having a meaningful flow is present, or when code having an iterative processing function of forming a loop is present, it may be determined that the possibility of firmware restoration being succeeded is high.

When firmware is encoded and encrypted, it may be impossible to detect a string or executable code. Therefore, because, for normally restored firmware, code for decoding and decrypting the firmware is present, the loop code detection function is required.

Furthermore, the processor 710 updates the pre-trained generation model by utilizing a system verification result based on system verification and the result of user verification on the firmware binary as feedback information.

For example, referring to FIG. 3, the AI-based automated mask ROM firmware binary restoration apparatus 300 internally performs system verification using functions such as string detection, executable code detection, and loop code detection, and provides the result 340 of the system verification to a user who conducts firmware reverse engineering, thus helping the user finally check whether restoration through the analysis of reverse engineering has succeeded.

Thereafter, the system verification result and the user verification result may be fed back into the AI-based automated mask ROM firmware binary restoration apparatus 300, as illustrated in FIG. 3, and may be input as compensation for reinforcing the capability to combine bits in the bit-order list.

Through these processes, the success rate of the automated firmware binary restoration function of the AI-based automated mask ROM firmware binary restoration apparatus 300 may be gradually improved.

The memory 730 stores the pre-trained generation model.

Also, the memory 730 stores various types of information generated by the AI-based automated mask ROM firmware binary restoration apparatus according to the embodiment of the present disclosure, as described above.

According to an embodiment, the memory 730 may support functions for AI-based automated mask ROM firmware binary restoration. Here, the memory 730 may function as a separate large-capacity storage, and may include a control function for performing operations.

By means of the AI-based automated mask ROM firmware binary restoration apparatus, there can be provided AI-based automated technology for restoring mask ROM firmware binaries.

Further, the present disclosure may perform mask ROM firmware binary restoration having a high success rate relative to human resources, time, and cost.

According to the present disclosure, there can be provided AI-based automated technology for restoring mask ROM firmware binaries.

Further, the present disclosure may perform mask ROM firmware binary restoration having a high success rate relative to human resources, time, and cost.

As described above, in the AI-based automated method for restoring a mask ROM firmware binary and the apparatus for the AI-based automated method according to the present disclosure, the configurations and schemes in the above-described embodiments are not limitedly applied, and some or all of the above embodiments can be selectively combined and configured so that various modifications are possible.

What is claimed is:

1. An Artificial Intelligence (AI)-based automated method comprising:
    extracting bit information from a mask Read-Only Memory (ROM) firmware, wherein the bit information represents a two-dimensional (2D) array of zeros and ones;
    obtaining at least one parameter associated with the mask ROM firmware, the at least one parameter comprises at least one of a chip identifier, a decoder position, manufacturer information, architectural information, or a physical layout of the mask ROM firmware;
    generating a bit-order list that indicates an order in which to select coordinates from the 2D array to read corresponding binary values, by inputting the bit information and the at least one parameter to a pre-trained generation model; and
    restoring a firmware binary of the mask ROM firmware based on the bit-order list.

2. The AI-based automated method of claim 1, wherein the pre-trained generation model corresponds to a model trained in consideration of an independent variable and a dependent variable of chip data and a bit-order list generation policy.

3. The AI-based automated method of claim 2, wherein the bit-order list generation policy is established based on a characteristic of the parameter associated with generation of the bit-order list.

4. The AI-based automated method of claim 1, further comprising:
    performing system verification on the firmware binary based on string detection, executable code detection, and loop code detection.

5. The AI-based automated method of claim 4, further comprising:
    updating the pre-trained generation model by utilizing a system verification result based on the system verification and a result of user verification on the firmware binary as feedback information.

6. An Artificial Intelligence (AI)-based automated apparatus comprising:
    a processor configured to;
        extract bit information from a mask Read-Only Memory (ROM) firmware, wherein the bit information represents a two-dimensional (2D) array of zeros and ones;
        obtain at least one parameter associated with the mask ROM firmware, the at least one parameter comprises at least one of a chip identifier, a decoder position, manufacturer information, architectural information, or a physical layout of the mask ROM firmware;
        generate a bit-order list that indicates an order in which to select coordinates from the 2D array to read corresponding binary values, by inputting the bit information and the at least one parameter to a pre-trained generation model; and
        restore a firmware binary of the mask ROM firmware based on the bit-order list; and
    a memory configured to store the pre-trained generation model.

7. The AI-based automated apparatus of claim 6, wherein the pre-trained generation model corresponds to a model trained in consideration of an independent variable and a dependent variable of chip data and a bit-order list generation policy.

8. The AI-based automated apparatus of claim 7, wherein the bit-order list generation policy is established based on a characteristic of the parameter associated with generation of the bit-order list.

9. The AI-based automated apparatus of claim 6, wherein the processor is configured to perform system verification on the firmware binary based on string detection, executable code detection, and loop code detection.

10. The AI-based automated apparatus of claim 9, wherein the processor is configured to update the pre-trained generation model by utilizing a system verification result based on the system verification and a result of user verification on the firmware binary as feedback information.

* * * * *